Nov. 25, 1941.   H. L. NORTHUP ET AL   2,263,815

METHOD OF MANUFACTURING OIL SEALS

Filed March 23, 1938   3 Sheets-Sheet 1

Inventors:
Harry L. Northup
Jens Agger
By: Cromwell, Greist & Warden, Attys

Nov. 25, 1941.  H. L. NORTHUP ET AL  2,263,815
METHOD OF MANUFACTURING OIL SEALS
Filed March 23, 1938  3 Sheets-Sheet 2

Inventors:
Harry L. Northup
Jens Agger
By: Cromwell, Greist + Warden
Attys.

Nov. 25, 1941.    H. L. NORTHUP ET AL    2,263,815
METHOD OF MANUFACTURING OIL SEALS
Filed March 23, 1938    3 Sheets-Sheet 3
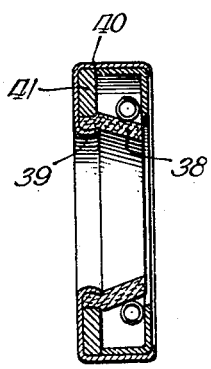
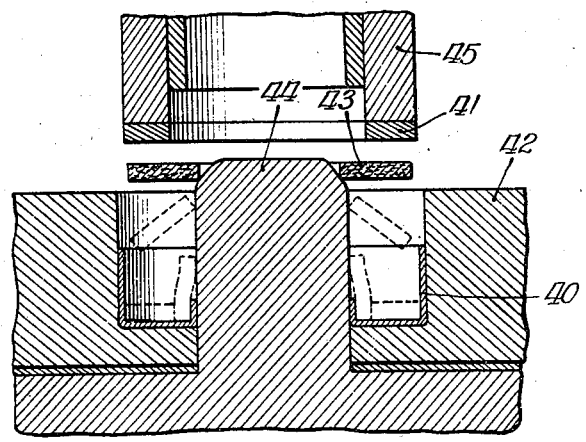
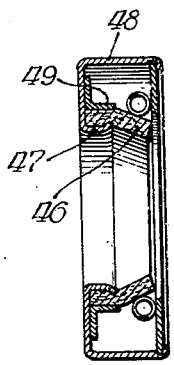
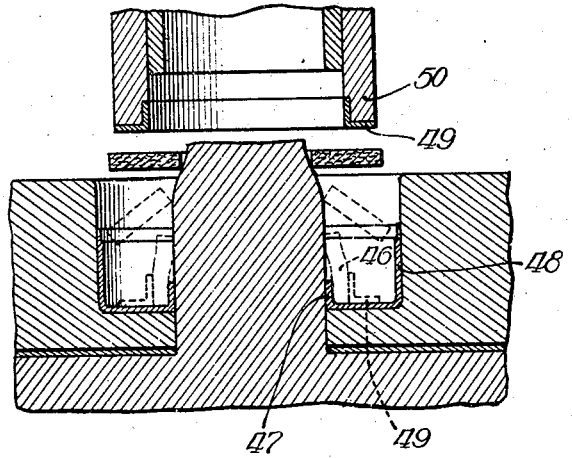
Inventors:
Harry L. Northup
Jens Agger
By: Cromwell, Greist + Warden
Attys.

Patented Nov. 25, 1941

2,263,815

UNITED STATES PATENT OFFICE 2,263,815

METHOD OF MANUFACTURING OIL SEALS

Harry L. Northup and Jens Agger, Chicago, Ill., assignors to Chicago Rawhide Manufacturing Company, Chicago, Ill., a corporation of Illinois Application March 23, 1938, Serial No. 197,747

5 Claims. (Cl. 29—84)

The present invention has to do with self-contained oil seals of the type in which the packing element is a somewhat flexible ring of leather, synthetic rubber, or other suitable material, of generally conical sleeve-like form.

The primary object of this invention is to provide an improved method of making seals of the type under consideration, which method will very materially reduce the cost of production and will at the same time result in a better product.

Other more specific objects and advantages of the invention will be evident to those skilled in the art upon a full understanding of the new method.

The method is applicable to the manufacture of seals of many different constructions. The method is herein illustrated and described by way of exemplification in connection with the manufacture of four different seal constructions, taken respectively from as many different patents, but it will of course be understood that the invention is applicable to various other seal structures without anything more than minor modifications all of which are contemplated as coming within the spirit of the invention and the scope of the appended claims.

In the accompanying drawings:

Fig. 18 is a partially sectioned edge view of a seal of the construction shown in Fig. 4 of Olsen Patent No. 2,000,349;

Fig. 19 is a sectional view of forming dies suitable for this seal, illustrating how the seal can be made in accordance with the new method; and Figs. 20 and 21 are views, corresponding to Figs. 18 and 19, showing a seal of the construction illustrated in Olsen Patent No. 2,093,021, and the application of the present method to that seal.

Figure 1:
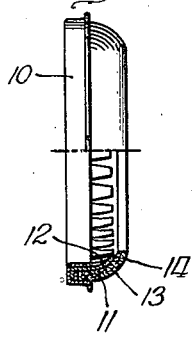
Fig. 1 is a partially sectioned edge view of a seal of the construction shown in Rockwell Patent No. 1,896,378.

Heretofore, in making a seal of the type in which the packing element is made of leather and has a sleeved out shaft-engaging portion, it has been the practice to preform the packing—that is to say, make up the packing into its final shape in a preliminary manufacturing operation, which operation is entirely separate and apart from the subsequently performed operations of assembling and connecting the packing with the casing and other parts of the seal.

This preliminary manufacturing operation has been a comparatively expensive one. It has involved the incorporation of special fillers in the packing for the purpose of bringing about a more or less permanent solidification of the packing in the shape into which pressed or molded. It has also involved the use of separate dies or molds, and separate cutting, trimming and treating equipment.

Where the packing element is made of other commonly used materials, such as synthetic rubber, the preforming of the packing is again a separate expensive operation—in this case the packing having to be shaped up in special molds.

The making of such preformed packings has been primarily either a leather treating operation or a rubber compounding operation, requiring the services of experts in those particular arts working with costly equipment specially designed for the purpose. Such preforming work is ordinarily done only in a plant devoted to the working of leather, or rubber, as the case may be, while the remaining work involved in the manufacture of a complete oil seal, namely, the assembling and connecting of an already preformed packing with the casing and other parts of the seal, is ordinarily done as a punch press or spinning operation by men who need be experienced only in the sheet metal stamping art. Because of these special treating and working operations connected with the production of preformed packings, most if not practically all manufacturers of oil seals of the type under consideration have for many years past procured the preformed packings for their seals from leather and rubber concerns, rather than attempt making the preformed packings in their own plants.

The present invention is quite revolutionary in the oil seal art in that it eliminates entirely the work and expense involved in preparing a preformed packing and greatly simplifies the manufacture of the oil seals by permitting the use of packing material in flat sheet condition, which packing material is cut in the form of plain washers and given its special sleeved out shaping in the same operation in which it is assembled with the casing of the seal.

In its broader aspect the invention consists in taking a flat washer of leather, synthetic rubber or other suitable packing material and forcing the inner and outer edges of the washer in opposite directions to produce from the same a packing of generally conical sleeve-like form, and then while holding the packing in this form inserting the larger end of the same into a channel provided in the casing of the seal, whereby the packing is held by the channel from returning to its original shape and will be retained permanently in its new form. The invention is preferably practiced in a punch press, by placing the washer in a downwardly converging sleeve over a mandrel which is slightly larger than the hole in the washer, then bringing a second sleeve down into engagement with the top of the washer adjacent the outer edge of the latter and moving the second sleeve down through the first sleeve to cause the washer to be first cupped down and then sleeved out into a generally conical sleeve-like form, and then advancing the second sleeve still farther to move the larger end of the then sleeve-shaped packing into the channel in the casing. After the larger end of the sleeve-shaped packing has entered the channel it may be permanently clinched therein by segmental expansion die members whereby to prevent withdrawal of the packing and eliminate any possibility of the same turning in the channel.

Figure 2:
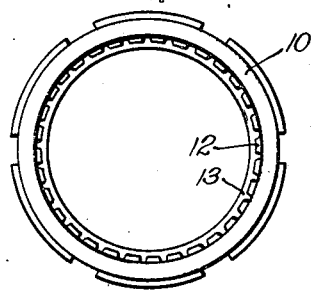
Figs. 2 and 3 are opposite end views of the seal shown in Fig. 1.
Figure 3:
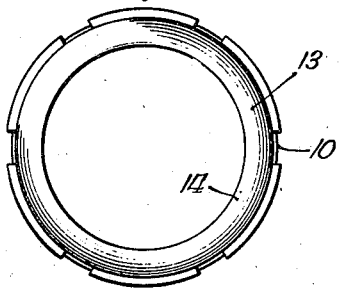
Figure 4:
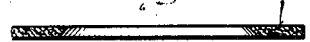
Fig. 4 is a sectional view of the flat centrally apertured disk or washer from which the packing element for this seal is made by the employment of the new method.
Figure 5:
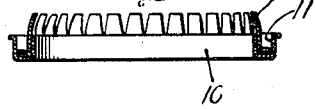
Fig. 5 is the metal stamping to which the packing element is joined by the new method.

The new method will first be described in connection with a seal of the construction shown in Figs. 1, 2 and 3 of the drawings. As will be observed in these views, the seal includes a sheet metal stamping 10 which contains an axially directed channel 11 in which a fingered spring ring 12 is secured. The stamping 10, which constitutes the casing of the seal, carries a packing element 13. This packing element 13, which is preferably made of leather but may be made of synthetic rubber or other suitable material, is a ring of generally conical sleeve-like form. The stamping 10 is designed for pressed-fit insertion in a recess in a housing about a shaft, and the packing 13 is adapted to engage at 14 with an annular collar of some sort on the shaft.

Figure 6:
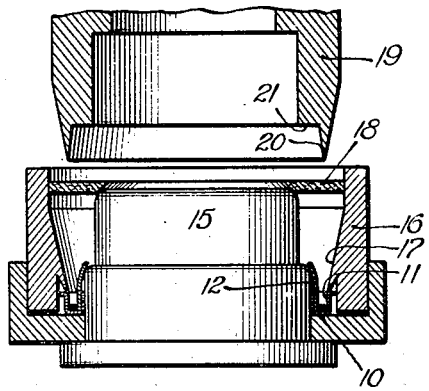
Figs. 6, 7, 8 and 9 are four sectional views of the forming dies used in making this seal, showing different stages in the formation of the seal.
Figure 8:
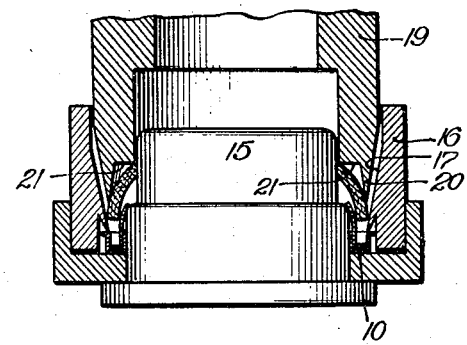
Figure 7:
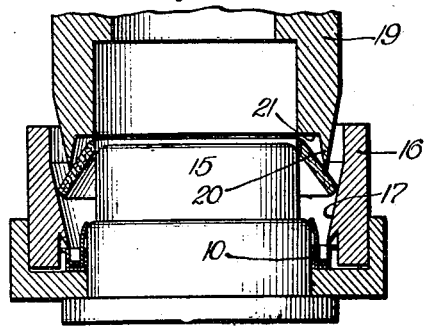
Figure 9:
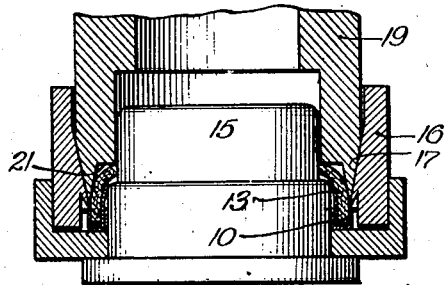

In making a seal of this construction, the stamping 10, with the fingered spring ring 12 secured within the channel 11 thereof, is placed in a press about a mandrel 15 at the bottom of a concentrically arranged sleeve 16. This sleeve has a downwardly converging inner wall 17 which is arranged with its lower edge even with the outer wall of the channel 11 in the stamping. A plain flat washer 18, cut from a sheet of leather or other suitable packing material, is then placed within the upper enlarged portion of the sleeve 16 with its inner edge, which is slightly smaller than the upper portion of the mandrel 15, resting upon the top of the mandrel, all as clearly shown in Fig. 6. A second sleeve 19 connected with the vertically movable portion of the press is then brought down on top of the washer 18. The lower edge 20 of the sleeve 19 is of thin downwardly tapering form and engages with the top of the washer 18 adjacent the outer edge of the latter, forcing the outer edge of the washer to cup downwardly into the downwardly converging portion 17 of the sleeve 16. At the same time, the engagement of the oversize mandrel with the under side of the inner edge of the washer 18 stretches and turns up the latter. This momentary intermediate shaping of the washer is shown in Fig. 7. As the sleeve 19 continues its downward movement, the downwardly converging inner wall 17 of the sleeve 16 progressively sleeves out the washer 18 by decreasing the diameter of the downwardly cupped lower edge thereof, and after the upper edge of the washer has expanded fully and started down over the mandrel 15 it is engaged by a shoulder 21 on the inside of the sleeve 19, which shoulder assists in bodily advancing the now sleeved out packing toward the stamping 10, as shown in Fig. 8. During the last part of the downward movement of the sleeve 19 the packing is directed by the lower portion of the downwardly converging inner wall 17 of the sleeve 16 into the channel 11 of the stamping, as shown in Fig. 9.

When the sleeve 19 is now returned to its uppermost position, and the sleeve 17 removed, the now fully developed packing 14—converted from the plain washer 18—will be snugly held by the channel in the stamping from returning to its original shape and will be retained permanently in its new form.

The packing can thereafter be clinched in the channel in any desired way, as by providing small indentations in one or both side walls of the channel, or by spinning one of the side walls slightly in toward the other. During this clinching, which may be performed on the seal either while it is still in the press or after it has been removed therefrom, the packing 13 will remain firmly and snugly disposed within the channel due to its frictional engagement with the same caused by the tendency of the packing to spring back out into its original condition. The confinement of the large diameter end of the packing in the channel acts to keep the small diameter end of the latter in its converted shape after the seal has been removed from the press.

In manufacturing a seal by this method, it will be understood that no preliminary treating or preforming of the packing material is necessary, with the result that the shaping up of the packing and the assembly of the latter with its casing structure can be accomplished in virtually a single manufacturing operation. When a seal is constructed in accordance with this new method, without resorting to the old practice of employing a preformed packing, a much better seal is obtained, due in large measure to the soft and uniform character of the sealing lip of the packing, which can be entirely free from the stiffening and solidifying wax-like fillers and surfacing substances with which ordinary preformed packings are impregnated.

It will of course be appreciated that the washer 18 does not necessarily have to be flat at the time of its insertion in the press. It might, for instance, be somewhat saucer-shaped when placed in the press, as a result of partial shaping brought about in connection with the action of the dies used in cutting the inner and outer circular edges of the washer. By initially cupping the washer to some extent a downwardly converging sleeve of smaller size could be substituted for the sleeve 16. The terms "washer" and "disk," as used in the claims, are therefore to be understood as embracing within their meaning dished or otherwise partially pre-shaped as well as flat structures, except of course where expressly limited to flat structures by other statements appearing in the claims.

Figure 10:
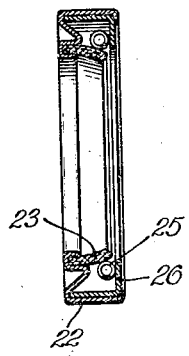
Figs. 10, 11 and 12 are views, corresponding to Figs. 1, 2 and 3, of a seal of the construction shown in Fig. 1 of Winter Patent No. 2,089,461.
Figure 11:
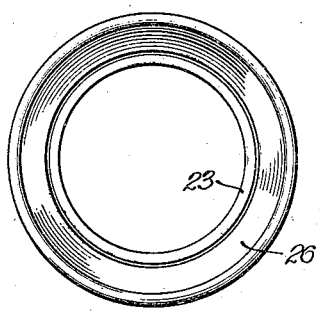
Figure 12:
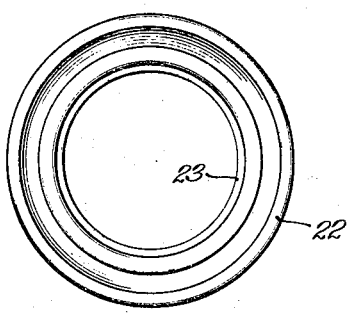
Figure 13:
Figs. 13 and 14 are sectional views of the flat washer and metal stamping used in making this particular seal by the new method.
Figure 14:
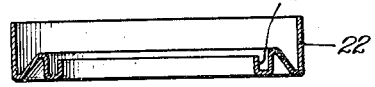

The method will next be described in connection with a seal of the construction shown in Figs. 10, 11 and 12 of the drawings. This seal includes a cup-shaped sheet metal stamping 22 and a sleeve-shaped packing 23 which is a little larger at one end than the other and has its larger end gripped within an axially directed channel 24 in the stamping. An endless coil spring 25 encircles the smaller end of the packing under some tension and is held in position thereon by a second cup-shaped stamping 26 which is inverted within the rim of the first stamping. The packing 23 of the seal is produced from a plain washer 27, which is illustrated in Fig. 13. The stamping 22 which receives and supports the packing as soon as it is formed up, is illustrated in Fig. 14.

Figure 15:
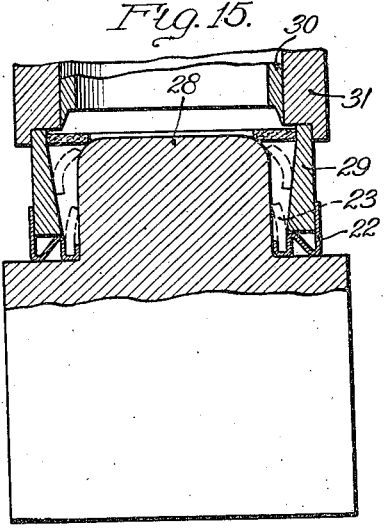
Fig. 15 is a sectional view of the forming dies used in carrying out the method on this seal, the flat washer in different stages of formation being shown in dotted lines.

The method of the invention can be applied to this type of seal by placing the stamping 23 in a press about the lower end of a mandrel 28 (see Fig. 15), placing a downwardly converging sleeve 29 over the stamping with the lower edge of the inner wall of the sleeve even with the outer wall of the channel 24 in the stamping, placing the washer 27 of packing material on top of the mandrel within the confines of the sleeve 29, and then bringing down a sleeve 30. The sleeve 30 may be guided properly with respect to the sleeve 29 by means of a separate adapter ring 31. As the sleeve 30 moves downwardly, the washer 27 will be progressively cupped, sleeved out and fed into the channel 24 in the stamping, as shown in two intermediate stages in dotted lines in Fig. 15.

Figure 16:
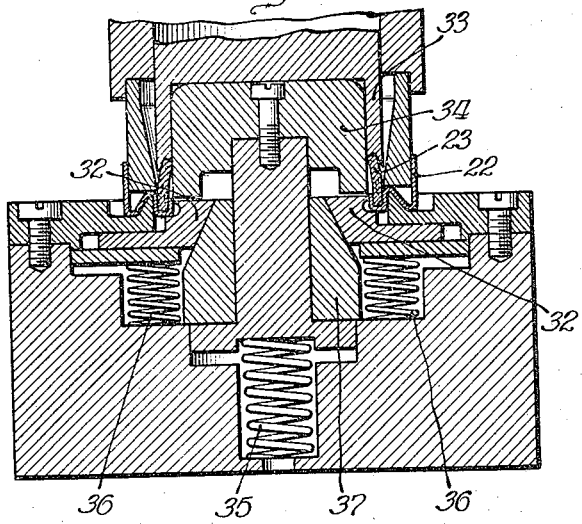
Fig. 16 is a sectional view of similar forming dies modified to include means for expanding the inner rim of the stamping to cause it to securely grip the packing element, in the same press operation.
Figure 17:
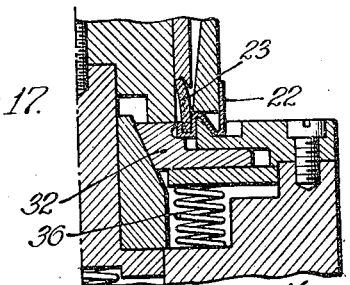
Fig. 17 is a fragmentary sectional view of the same dies, after the clamping rim on the stamping has been expanded.

The packing 23 may be securely clinched in the channel 24 of the stamping 22 in the same press operation, if desired, by employing segmental expansion die members 32 at the base of the mandrel (see Figs. 16 and 17). As soon as the packing is fed into the channel in the stamping, further downward movement of the sleeve 33 causes the mandrel 34 to move downwardly with it against the yielding resistance of a spring 35. This movement of the mandrel brings it into engagement with the segmental die members 32, and as the members 32 move downwardly under the yielding resistance of springs 36 they are cammed outwardly by a cone-shaped stationary center member 37. This small but positive outward radial movement of the die members 32 is sufficient to expand the inner wall of the channel in the stamping and curve it somewhat at its free edge, all as clearly shown in Fig. 17. After this has been done, all that remains to complete the seal is to insert the spring 25 and closure 26 and turn the edge of the stamping 22 over the closure 26, by a final press operation.

In making a seal of the construction shown in Fig. 18—wherein the large diameter end of a sleeve-shaped packing 38 is gripped between a reentrant flange 39 on the casing 40 of the seal and a metal spacing washer 41 on the inside of the casing—the new method may be practiced by placing the casing 40 in the bottom of a hollow die 42 (see Fig. 19), placing a flat washer 43 of the packing material on top of a mandrel 44, and placing the metal washer 41 against the bottom of the vertically movable sleeve 45, which sleeve may be magnetized at its lower edge to hold the washer temporarily in position. Then when the sleeve 45 is lowered, the spacing washer 41 will engage with the outer portion of the packing washer 43, force the latter to expand at its inner edge and contract at its outer edge and sleeve out along the mandrel 44, and finally wedge in its final position between the lower edge of the packing and the outer wall of the casing. This wedged engagement will keep the spacing washer 41 from moving back up again on the return stroke of the sleeve 45. The seal may then be removed from the die 42 and finished.

In making a seal of the construction shown in Fig. 20—wherein the large diameter end of a sleeve-shaped packing 46 is gripped between a reentrant flange 47 on the casing 48 of the seal and a sheet metal confining ring 49 of L-shaped radial section surrounding the same—the method may be practiced in much the same way as illustrated in Fig. 19, the confining ring 49 being carried during the closing of the dies by a magnetized lower edge portion of the downwardly moving sleeve 50, as shown in Fig. 21.

While the invention has been herein illustrated and described in its application to internal seals, it will of course be understood that it is equally applicable to external seals, wherein the small diameter end of the sleeve-shaped packing, rather than the large diameter end, is held in a channel provided by the supporting structure of the seal. In practicing the invention with an external seal, the expanded inner edge of the packing washer—not the contracted outer edge—would be the edge fed into the channel.

We claim:

1. The method of making a self-contained oil seal of the type having a sleeve-shaped packing and a casing in which one end of the packing is held, which consists in taking a centrally apertured disk of the packing material presenting inner and outer peripheral edges, expanding one edge of the disk by axial movement of said edge in one direction and contracting the other edge of the disk by axial movement of said edge in the opposite direction to sleeve out the disk, and inserting one of the deformed edges in a channel of corresponding size in the casing, without allowing it to spring back from its sleeved out shape toward its original disk shape.

2. The method of making a self-contained oil seal of the type having a sleeve-shaped packing and a casing in which one end of the packing is held, which consists in taking a centrally apertured disk of the packing material presenting inner and outer peripheral edges, contracting one edge of the disk by axial movement of said edge to sleeve out the disk, and inserting the contracted edge between concentric gripping elements in the casing without allowing it to spring back from its sleeved out shape toward its original disk shape.

3. The method of making a self-contained oil seal of the type in which the packing element is of generally conical sleeve-like form and is secured at its larger end within an axially opening channel in a casing, which consists in taking a substantially flat apertured disk of relatively thin flexible packing material presenting inner and outer peripheral edges and forcing the inner and outer peripheral edges of the disk in opposite axial directions to convert the apertured disk from its original condition to a generally conical sleeve-like condition to produce from the same a packing of generally conical sleeve-like form, and then while holding the packing element in this form inserting the larger end of the same into the axially extending channel in the casing, whereby the packing element will be held by the channel from returning to its original shape and will be retained permanently in its converted form.

4. The method of making a self-contained oil seal of the type in which the packing element is of generally conical sleeve-like form and is secured at its larger end within an axially opening channel in a casing, which consists in taking a flat annular sheet of relatively thin flexible packing material presenting inner and outer peripheral edges and forcing the inner and outer peripheral edges of the sheet in opposite axial directions to convert the annular sheet from a flat condition to a sleeve-like condition to produce from the same a packing of generally conical sleeve-like form, then while holding the packing element in this form inserting the larger end of the same into the axially extending channel in the casing, whereby the packing element will be held by the channel from returning to its original shape and will be retained permanently in its converted form, and thereafter clinching the channel to prevent withdrawal of the packing.

5. The method of making a self-contained oil seal of the type having a generally conical sleeve-shaped packing and a casing in which one end of the packing is held, which consists in taking a centrally apertured disk of thin flexible packing material presenting inner and outer peripheral edges, moving the outer edge of the disk axially with respect to the other edge to sleeve out the disk to a generally conical sleeve-like shape and simultaneously reduce the diameter of said outer edge, and while the flexible packing is held in this shape inserting the reduced diameter edge between concentric gripping elements in the casing without allowing the disk to move back from its sleeved-out shape toward its original disk shape.

HARRY L. NORTHUP.
JENS AGGER.